United States Patent
Forcke et al.

(10) Patent No.: US 11,663,653 B2
(45) Date of Patent: May 30, 2023

(54) INTERCEPTION OF DIGITAL INTERACTION TO DRIVE DESIRED OUTCOMES

(71) Applicant: International Business Machines Corporation, Armonk, NY (US)

(72) Inventors: K. Anne-Rivers Forcke, Henrico, VA (US); Dimitri Kanevsky, Ossining, NY (US); Walter S. Kuhnel, Round Rock, TX (US); Elizabeth V. Woodward, Cedar Park, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 809 days.

(21) Appl. No.: 14/473,128

(22) Filed: Aug. 29, 2014

(65) Prior Publication Data

US 2016/0063618 A1     Mar. 3, 2016

(51) Int. Cl.
*G06Q 40/00*     (2012.01)
*G06Q 30/0251*     (2023.01)

(52) U.S. Cl.
CPC ......... *G06Q 40/00* (2013.01); *G06Q 30/0269* (2013.01)

(58) Field of Classification Search
CPC .... G06Q 30/02; G06Q 40/00; G06Q 30/0251; G06Q 30/0242; G06Q 30/0271
See application file for complete search history.

(56) References Cited

U.S. PATENT DOCUMENTS

| 5,918,217 A | * | 6/1999 | Maggioncalda ... G06Q 30/0601 705/36 R |
| 8,195,503 B2 | | 6/2012 | Furin et al. |
| 8,301,501 B1 | * | 10/2012 | Glaeser ................. G06Q 20/20 705/17 |
| 8,429,051 B1 | | 4/2013 | Samson |
| 8,494,946 B2 | | 7/2013 | Lortscher, Jr. |

(Continued)

OTHER PUBLICATIONS

IBM et al., "Adaptive Goal Management Tool", IP.com Prior Art Database Technical Disclosure, IP.com No. QPCOM000174170D, Aug. 30, 2008.

*Primary Examiner* — Bennett M Sigmond
*Assistant Examiner* — Marla Hudson
(74) *Attorney, Agent, or Firm* — Scully, Scott, Murphy & Presser, PC; Erik Johnson, Esq.

(57) ABSTRACT

Method, system and computer program product for transaction evaluation based on a potential impact of the potential transaction on defined plans. In one embodiment, the method comprises receiving at a financial analysis computer system specified interactions intercepted when a person uses a client computing device to identify a potential transaction, and the analysis computer system processing these interactions for determining a potential impact of said transaction on one or more defined goals of the person. Before the person commits to the transaction, the analysis computer system generates a client guidance signal based on this determining, and sends the client guidance signal to the client computing device to instruct that device to convey guidance to the specified about the transaction. The specified interactions received at the financial analysis computer system data may identify a transaction context and activity of the person.

18 Claims, 3 Drawing Sheets

(56) References Cited

U.S. PATENT DOCUMENTS

| | | | | |
|---|---|---|---|---|
| 8,533,092 B1* | 9/2013 | Burrow | ................ | G06Q 40/02 |
| | | | | 705/35 |
| 8,566,208 B1 | 10/2013 | Cunningham et al. | | |
| 2003/0088489 A1 | 5/2003 | Peters et al. | | |
| 2006/0074788 A1 | 4/2006 | Grizack et al. | | |
| 2007/0143275 A1 | 6/2007 | Bagley et al. | | |
| 2010/0280935 A1* | 11/2010 | Fellowes | ................ | G06Q 40/00 |
| | | | | 705/35 |
| 2011/0251951 A1* | 10/2011 | Kolkowitz | ............ | G06Q 20/10 |
| | | | | 705/39 |
| 2011/0276451 A1 | 11/2011 | Busse | | |
| 2012/0232968 A1* | 9/2012 | Calman | ............ | G06Q 30/0207 |
| | | | | 705/14.4 |
| 2014/0136381 A1* | 5/2014 | Joseph | ................ | G06Q 40/02 |
| | | | | 705/35 |
| 2014/0258023 A1* | 9/2014 | Joa | ........................ | G06Q 40/00 |
| | | | | 705/26.7 |

* cited by examiner

INTERCEPTION OF DIGITAL INTERACTION TO DRIVE DESIRED OUTCOMES

BACKGROUND

This invention generally relates to helping consumers reach financial goals. More specifically, embodiments of the invention evaluate potential transactions by consumers and provide feedback about how those potential transactions would affect specified goals.

Enterprises today, for the most part, market their products and services by analyzing patterns of behavior and displaying advertisements for their products and services to consumers. This often leverages semantic analysis of social data and electronic interaction to make assumptions about what products and services the consumers might want.

Semantic analysis of social data and electronic interaction is an inexact science. Someone may be speaking extensively about some topic not because they care about it personally, but because someone else in their social network cares about that topic.

SUMMARY

Embodiments of the invention provide a method, system and computer program product for transaction evaluation based on a potential impact of the potential transaction on defined plans. In one embodiment, the method comprises receiving at a financial analysis computer system specified interactions intercepted when a specified person uses a client computer device to identify a potential transaction, and the financial analysis computer system processing said specified interactions for determining a potential impact of said potential transaction on one or more defined goals of the specified person. Before the specified person commits to said transaction, the financial analysis computer system generates a client guidance signal based on said determining, and sends the client guidance signal to the client computing device to instruct the client computing device to convey specified guidance to the specified person about the potential transaction.

In an embodiment, the specified interactions received at the financial analysis computer system data identify a defined transaction context and defined activity of the specified person.

In one embodiment, the defined purchase context and defined activity of the specified person are identified by an analysis of text on a display screen of the client computing device.

In an embodiment, the defined purchase context and defined activity of the specified person are identified by an analysis of images on a display screen of the client computing device.

In an embodiment, the specified guidance includes a representation on the client computing device of how the potential transaction impacts the one or more defined goals of the specified person.

In one embodiment, the specified guidance includes one or more defined images shown on the client computing device to dissuade the specified person from committing to, or to persuade the specified person to commit to, the potential transaction.

In an embodiment, the specified guidance includes one or more alternative transactions.

In one embodiment, the specified guidance includes recommendations for specified services or products based on a determined impact of the potential transaction on said one or more goals of the specified person.

In an embodiment, the method further comprises storing in a goal repository the one or more defined goals of the specified person. The financial analysis computer system uses the specified interactions for comparing the potential transaction to the one or more defined goals stored in the repository for the specified person; and on the basis of this comparing, determines defined guidance for the specified person about the potential transaction. The financial analysis computer system generates the client guidance signal based on this defined guidance.

In an embodiment, the client computing device includes an evaluation module to evaluate the potential transaction and to generate specified data about the potential transaction, and the financial analysis computer system receives said specified data from the client computing device. The financial analysis computer system processes the specified data from the client computing device for determining the potential impact of said potential transaction on the one or more defined goals of the specified person. The client guidance signal instructs the client computer system to show a specified message on a display screen of the client computer system to convey said specified guidance about the potential expense.

Embodiments of the invention collect financial goals from a user, integrate with the data sources of a financial institution, and evaluate purchase interactions in progress (prior to completion) using context to determine if the purchase meets the goals established by the user. Guidance may be provided to the user to enable them to meet their financial goals.

Embodiments of the invention enable financial institutions (for example, those with banking, credit card and other financial data about a user) to derive financial goals and to intercept digital interactions to drive desired outcomes.

Embodiments of the invention provide a real time wish purchase evaluation based on its potential impact on stated goals of the consumer.

DETAILED DESCRIPTION

As indicated above, enterprises today often market their products and services by analyzing patterns of behavior and displaying ads for their products and services to consumers. This may leverage semantic analysis of social data and electronic interaction to make assumptions about what products and services the consumer might want. While this use of semantic analysis may be helpful, it is not an exact science. Moreover, this analysis does not always enable the enterprise to provide consumers what they want.

Enterprises deliver personalized marketing to customers by analyzing the customer online activities and presenting ads for products and services. A problem with this type of marketing is that the advertisements make assumptions about goals and tools that help customers achieve their goals, while the customers' goals tend to be managed by separate applications (for example: a separate, single application for managing finances).

Existing financial management systems, for example, do not intercept purchasing decisions and evaluate the impact of those purchasing decisions against a specific consumer's goal at real time. Often they provide an analysis or summary statement after the purchase has been completed. Also, existing financial management systems do not provide guidance based on financial plans prior to the customer following through with a purchase.

Literature today indicates that enterprises are more likely to win and retain customers if they are able to create a sense of "customer intimacy," where the enterprises meet the needs of customers and enable customers to achieve their personal goals. In this way, the enterprise is enabling the consumer rather than selling to the consumer.

Embodiments of the invention enable financial institutions, such as those with banking, credit card and other financial data about a user, to derive financial goals for customers and to intercept digital interaction involving those customers to drive desired outcomes.

In one embodiment, the invention provides a method of providing transaction evaluation based on a potential impact of the transaction on defined goals. The method comprises receiving at a financial analysis computer system specified interactions intercepted when a specified person uses a client computing device to identify a potential transaction. The financial analysis computer system processes the specified interactions for determining a potential impact of the potential transaction on one or more defined goals of the specified person. Before the specified person commits to the transaction, the financial analysis computer system generates a client guidance signal based on the determining, and sends the client guidance signal to the client computing device to instruct the client computing device to convey specified guidance to the specified person about the potential transaction.

Figure 1:
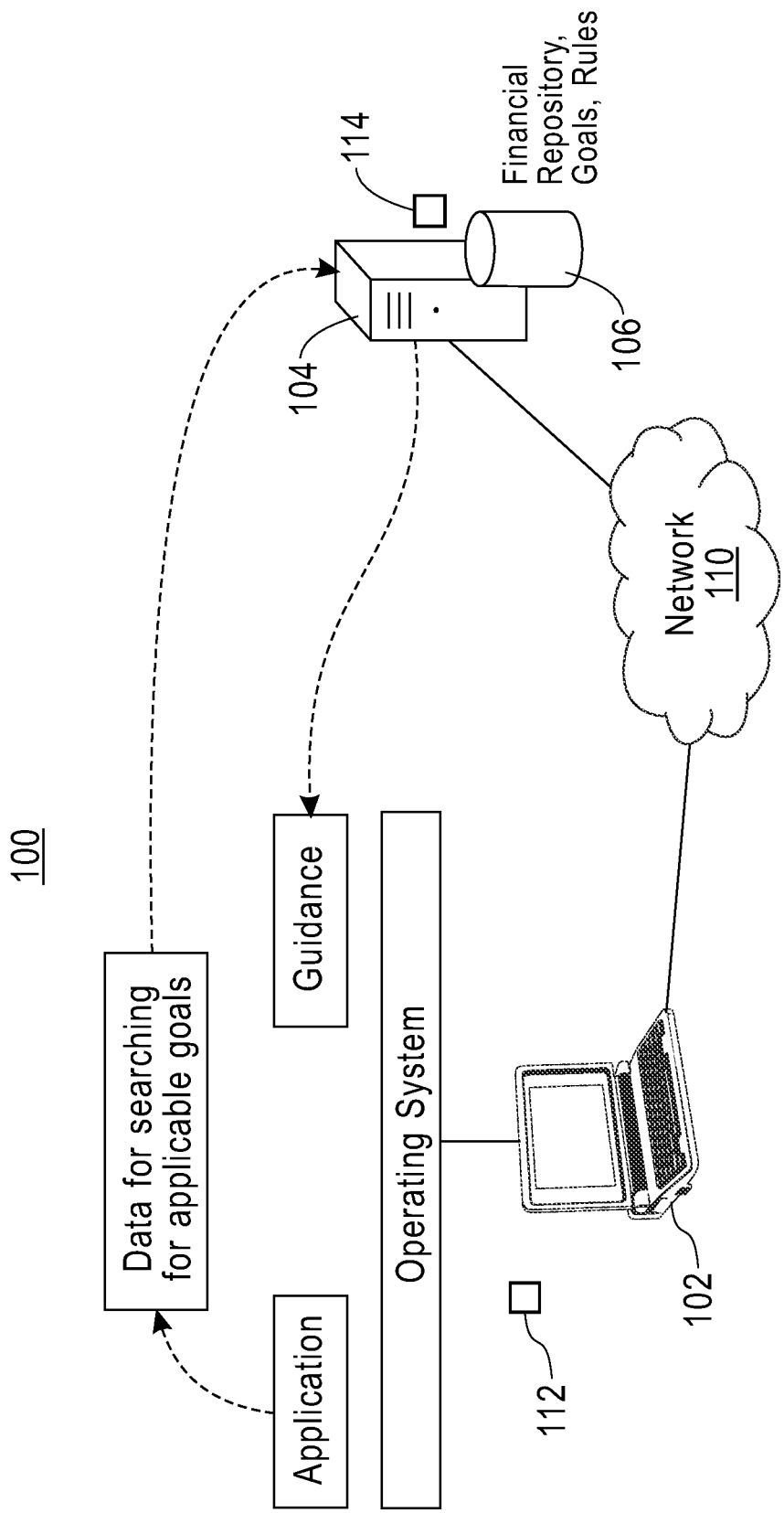
FIG. 1 illustrates a networked system in which embodiments of the invention may be implemented

FIG. 1 shows a network system 100 in which embodiments of the invention may be implemented. Generally, network system 100 includes a client computing device 102, a server computer system 104 and a repository 106. FIG. 1 also shows a network 110 connecting the client computing device and the server computer system.

Generally, the client computing device 102 receives input from a user and transmits data to and receives data from other computing devices or computer systems via network 110. Server computer system 104, similarly, transmits data to and receives data from other computing devices or computer systems via network 110. Server computer system is also connected to data repository 106 to store data in and to retrieve data from that repository.

Client 102 may be, for example, a personal computer, a network computer, a workstation, laptop, mobile computer, a smart phone or other mobile device, a point of sale or other computing device.

Any suitable server computer system 104 may be used in the practice of this invention. For example, the invention may utilize a computer server based on one or more zSeries 900 computers offered by the International Business Machines Corporation, Armonk, N.Y. High performance Computers (HPCs) may also be used in the implementation of the present invention.

Network 110 is the medium used to provide communication links between various devices and computers connected together within distributed network system 100. The network 110 may include connections, such as wire, wireless communication links, or fiber optic cables. In the depicted example, network 110 is the Internet which is a worldwide collection of networks and gateways that use the Transmission Control Protocol/Internet Protocol (TCP/IP) suite of protocols to communicate with one another. The distributed network system 100 may also be implemented to include a number of different types of networks, such as for example, an intranet, a local area network (LAN), a wide area network (WAN), or the like. FIG. 1 is intended as an example, not as an architectural limitation, and the particular elements shown in FIG. 1 should not be considered limiting with regard to the environments in which the illustrative embodiments of the present invention may be implemented. Also, distributed system 100 may include additional servers, clients, and other devices not shown.

In an embodiment of the invention, a user interface is provided that enables financial goals to be established for a consumer. These goals might be established by the consumer himself or herself, or these goals might be established for the consumer by someone else. For example, a parent might establish goals for a son or a daughter.

Many specific types of goals may be established. For example, a goal might be to save a specific amount of money, such as $20,000, for college by a certain year. Also, a goal could be to keep spending within certain limitations. For instance, the goal could be to limit spending on clothing to $75 per month, or to limit gasoline purchases to $80 per month, etc.

Figure 2:
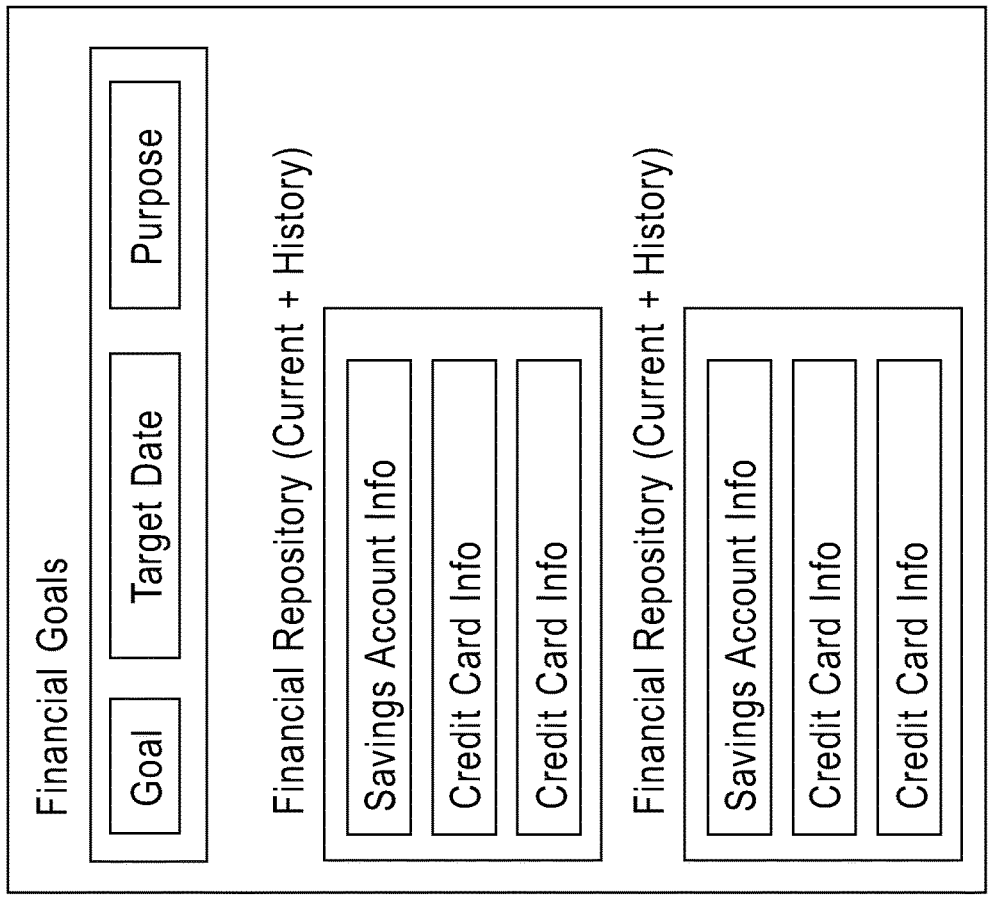
FIG. 2 shows financial goals and applications that may be used in embodiments of the invention.
Figure 2:
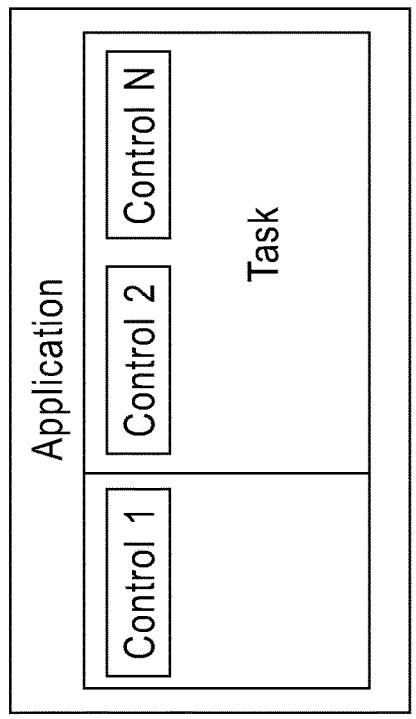

FIG. 2 illustrates financial information that might be kept on repository in an embodiment of the invention. As shown in FIG. 2, a record 202 may be kept of the goals, and for each goal, a target date and a purchase could be stored. Other financial data about a person, such as savings account information and credit card information, could also be stored in the repository.

In embodiments of the invention, applications 210 are also stored in the repository. These applications are invoked by the server processor to analyze different types of potential transactions by the consumer. For instance, one type of application might be used to analyze regular expenses such as rent and food, another application might be used to analyze necessary but irregular expenses such as medical bills or car repairs. Another application, for example, might be used to keep track of longer term goals, such as saving for college or for a home down payment, and to analyze how other types of potential expenses might affect these goals.

In embodiments of the invention, a purchase evaluation module, represented at 112 in FIG. 1, is provided to evaluate potential purchases of the consumer. This module may be integrated into a client agent (e.g., a browser, a credit cared terminal, a mobile device).

In embodiment of the invention, a financial decision engine, represented at 114 in FIG. 1, is used to read an image or text, such as a purchase cart or list, that may be displayed on the user's client computer system, to provide instant feedback before the user's purchase is complete. This feedback may be based on purchase categories (e.g., necessities, luxuries, on-plan items).

The financial decision engine is used to collect the user's financial status from different channel, for instance, banking and investing accounts, and expense pattern, analysis and prediction. The engine also may be used to set up financial goals. The purchase evaluation model is used to evaluate the current wish purchase against the financial goals. In embodiments of the invention, the financial decision engine and the purchase evaluation model can be merged.

Interactions related to a purchase decisions are transferred to the financial institution, where those decisions are evaluated to determine if the decisions comply with the consumer's goal. For example, with the system shown in FIG. 1, server computer system is operated by or on behalf of the financial institution, and these interactions may be transmitted from the client computer to the server computer system.

The financial institution has authentication information to authenticate the consumer and goals information for that consumer. The financial institution has or is provided with purchase price information, information about which account is to be used, and other information about the purchase. This other information may be what is to be purchased, and the quantity to be purchased. Information may be obtained through image analysis of the image on the consumer's computer display screen, or through page or site content. Financial institution information may include, for example information about the consumer's bank account or accounts, about the consumer's credit card or cards, about the consumer's history, etc.

Based on the analysis done by the financial institution, guidance is given to the consumer. This may be done, as examples, by popup or sidebar messages on the user's computer display screen. Graphs may be displayed showing progress in attainment of goals. A yes/no rating may be shown for the purchase decision. Alternatively, lesser-priced options for the user may be displayed. Additional related services can be shown that the financial institution can provide to enable attainment of goals given the current status of the goals.

In embodiments of the invention, purchase context and activity is detected in advance of the purchase. This may be done, for example, by an analysis of text in the display screen of the user's computer, or by an analysis of images on that display screen. This may also be done via the presence of a purchase care on the display screen, or the item or items in a purchase cart.

The guidance may take the form of recommendations for services and products based on the impact of the current purchase on the user's goal. For example, a user may be told that he or she will have enough in savings to open a certain kind of account or to obtain a higher interest on an account. Also, the guidance may be by deactivating submit buttons on the user's computer display screen.

The stated goals may be derived in a number of ways. For instance, the stated goals may be derived through financial analysis, an application, a Web-based questionnaire, access to a private datastore that indicates the goals, or other methods.

The user history may relate to all financial data available to an institution. This information may include banking, social, or personal information, data available in datastores, or credit card information such as activity over time.

Figure 3:
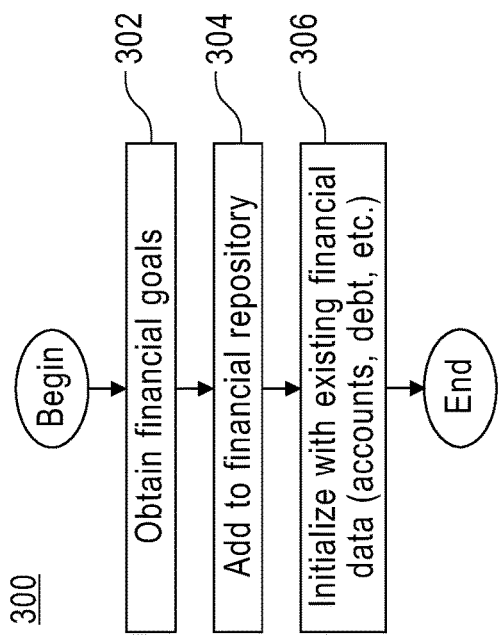
FIG. 3 shows a procedure for obtaining and processing financial goals.

FIG. 3 shows a procedure 300 for storing financial goals of a person and related financial data. In this embodiment, at step 302, financial goals are obtained for the person. For example, the goals may be to save a certain amount of money by a specified date, for example, to pay college tuition or for a down payment on a home. Also, the goals may be to stay within a specified budget, either for one item or for a group of expenses, or for multiple types or classes of expenses. The goals for an individual may be input by that individual or they may be input by someone else. For example, as mentioned above, a parent may input goals for his or her son or daughter.

At step 304, the goals are added to the financial repository. Other financial data may be added to the repository. This other data may include, for instance, information about bank accounts, credit card accounts, or other accounts, or information about debts, etc. At step 306, the repository is initialized with existing financial data about the person, such as accounts, debts, etc.

Figure 4:
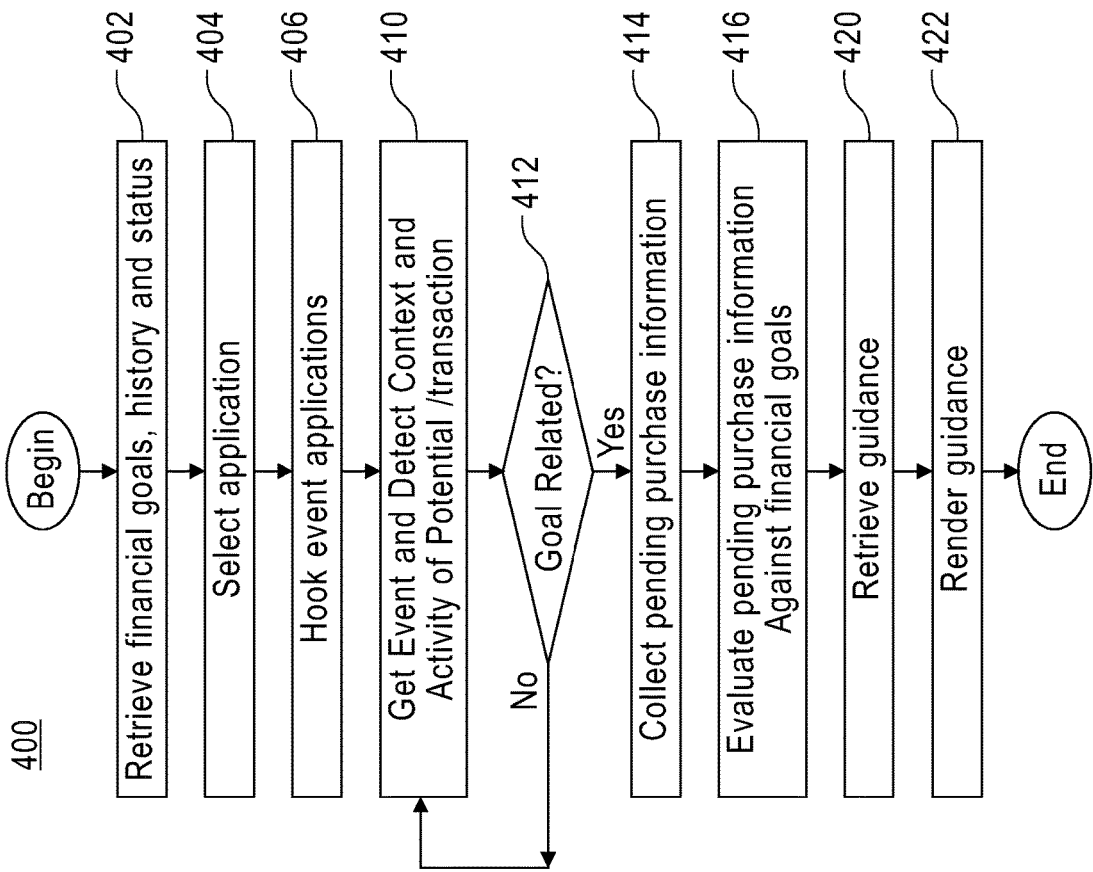
FIG. 4 is a flow chart illustrating an embodiment of the invention.

FIG. 4 illustrates one embodiment 400 of a method for analyzing a prospective or pending purchase of a person and for providing guidance to that person about the purchase. At step 402, relevant information, such as financial goals, history and status, are retrieved from the financial repository. At step 404, an application running on the client computing device 102 is selected; and at step 406, server 104 connects, or hooks, to this application. This application may be any application running on the client computing device that is used to purchase goods or services.

At step 410, server 104 receives event data from the hooked application; and at step, this event data is analyzed to determine if the data relate to one of the stored goals for the person. If the data do not relate to any of those goals, the procedure returns to step 410, and steps 410 and 412 are repeated until event data are obtained that does relate to one or more goals of the person.

When event data are obtained that relate to one or more goals of the person, the procedure 400 moves on to steps 414 and 416. At step 414, information is collected about the pending purchase; and at step 416, this pending purchase information is evaluated against the financial goal or goals of the person. Based on this evaluation, guidance for the person is retrieved at step 420, and guidance is rendered to the person at step 422.

The following examples illustrate aspects of embodiments of the invention.

Case 1: Parental Control of Child Financial Behavior

A parent sets up a financial profile for his/her child, with certain conditions: for instance, a list of allowed and/or disallowed purchase items and/or vendors, and a payment limit ($80) and a monthly limit ($500). Before the child makes an electronic payment, the profile is applied in real time to verify the purchases; if they are allowed items within the limit for the specific purchase and within an overall goal.

Case 2: Balanced Budget

A person sets up a financial goal to line up his spending with his investment return, home loan payments, and savings for education. In this case, the allowed amount of spending would be calculated and predicated based on multiple factors, as well as his spending pattern. Real time advice would be displayed to him as if the purchase would meet his financial goal, or, to indicate that if he makes this purchase, he might not be able to pay for another item on his wish list.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the present invention has been presented for purposes of illustration and description, but is not intended to be exhaustive or to limit the invention in the form disclosed. Many modifications and variations will be apparent to those of ordinary skill in the art without departing from the scope of the invention. The embodiments were chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method of providing feedback to a client computer device about a potential impact of a potential transaction on defined goals of a specified person, the method comprising:
   retrieving at a financial analysis computer system financial information about the specified person from a financial repository;
   connecting via a network at the financial analysis computer system, after retrieving said financial information, with a client application running on the client computer device, said client application being selected by the specified person to purchase goods or services;

receiving via the network at the financial analysis computer system computer code of specified digital interactions intercepted from a display screen of the client computer when the specified person uses the client application running on the client computer device;

automatically analyzing at the financial analysis computer system the detected display screen computer code to detect context and activity of the intercepted specified digital interactions;

automatically identifying a potential purchase transaction based on an analysis of the context and activity of the specified digital interactions on display screen;

automatically determining at the financial analysis computer system whether the potential purchase transaction relates to one or more defined financial goals of the specified person;

storing in the financial analysis computer system a plurality of transaction analysis applications, each of the transaction analysis applications being used to analyze an associated type of transaction;

automatically invoking at the financial analysis computer system one or more of the plurality of transaction analysis applications to process said intercepted specified digital interactions determined to be related to the one or more defined financial goals of the specified person to determine a potential impact of said potential transaction on the one or more defined financial goals of the specified person; and automatically generating at the financial analysis computer system computer code for execution of a client guidance signal based on the determined potential impact of the potential purchase transaction, before the specified person commits to said potential transaction, in real time, and sending via the network the computer code for execution of the client guidance signal to the client computing device to instruct the client computing device to convey specified guidance to the specified person about the potential transaction.

2. The method according to claim 1, wherein the defined purchase context and activity are identified by reading text on the display screen.

3. The method according to claim 1, wherein the defined purchase context and activity are identified by reading images on the display screen.

4. The method according to claim 1, wherein the specified guidance includes a representation on the client computing device of how the potential transaction impacts the one or more defined goals of the specified person.

5. The method according to claim 1, wherein the specified guidance includes one or more defined images shown on the client computing device to dissuade the specified person from committing to, or to persuade the specified person to commit to, the potential transaction.

6. The method according to claim 1, wherein the specified guidance includes one or more alternative transactions.

7. The method according to claim 1, wherein the specified guidance includes recommendations for specified services or products based on a determined impact of the potential transaction on said one or more goals of the specified person.

8. The method according to claim 1, further comprising: storing in a goals repository the one or more defined goals of the specified person; and wherein:

the financial analysis computer system processing said specified interactions includes the financial analysis computer system using the specified interactions for comparing the potential transaction to the one or more defined goals stored in the repository for the specified person; and on the basis of said comparing, determining defined guidance for the specified person about the potential transaction; and the financial analysis computer system generating a client guidance signal includes the financial analysis computer system generating the client guidance signal based on said defined guidance.

9. The method according to claim 1, wherein:

the client guidance signal instructs the client computer system to show a specified message on the display screen to convey said specified guidance about the potential expense.

10. A computer system for providing feedback to a client computing device about a potential impact of a potential transaction on defined goals of a specified person, the computer system comprising:

one or more computer processors;

one or more non-transitory computer-readable storage media;

program instructions, stored on the one or more non-transitory computer-readable storage media, which when implemented by the one or more processors, cause the computer system to perform the steps of:

retrieving at a financial analysis computer system financial information about the specified person from a financial repository;

connecting via a network at the financial analysis computer system, after retrieving said financial information, with a client application running on the client computer device, said client application being selected by the specified person to purchase goods or services;

receiving via the network at the financial analysis computer system computer code of specified digital interactions intercepted from a display screen of the client computer when the specified person uses the client application running on the client computer device;

automatically analyzing at the financial analysis computer system the detected display screen computer code to detect context and activity of the intercepted specified digital interactions;

automatically identifying a potential purchase transaction based on an analysis of the context and activity of the specified digital interactions on display screen;

automatically determining at the financial analysis computer system whether the potential purchase transaction relates to one or more defined financial goals of the specified person;

storing in the financial analysis computer system a plurality of transaction analysis applications, each of the transaction analysis applications being used to analyze an associated type of transaction;

automatically invoking at the financial analysis computer system one or more of the plurality of transaction analysis applications to process said intercepted specified digital interactions determined to be related to the one or more defined financial goals of the specified person to determine a potential impact of said potential transaction on the one or more defined financial goals of the specified person; and automatically generating the financial analysis computer system computer code for execution of a client guidance signal based on the determined potential impact of the potential purchase transaction, before the specified person commits to said potential transaction, in real time, and sending via the network the computer code for execution of the client guidance signal to the client computing device to instruct the client computing device to convey specified guidance to the specified person about the potential transaction.

11. The system according to claim 10, wherein the client computing device includes a display screen, and the defined purchase context and defined activity are identified by reading text or images on the display screen.

12. The system according to claim 10, wherein the specified guidance includes a representation on the client computing device of how the potential transaction impacts the one or more defined goals of the specified person.

13. The system according to claim 10, wherein:
the client guidance signal sent from the financial analysis module to the client computing device the instructs the client computer system to show a specified message on the display screen to convey said specified guidance about the potential expense.

14. An article of manufacture comprising:
program instructions on a non-transitory computer-readable storage medium, where execution of the program instructions using a computer causes the computer to perform a method for providing feedback to a client computer device about a potential impact of a potential transaction on defined goals of a specified person, comprising:
retrieving at a financial analysis computer system financial information about the specified person from a financial repository;
connecting via a network at the financial analysis computer system, after retrieving said financial information, with a client application running on the client computer device, said client application being selected by the specified person to purchase goods or services;
receiving via the network at the financial analysis computer system computer code for specified digital interactions intercepted from a display screen of the client computer when the specified person uses the client application running on the client computer device;
automatically analyzing at the financial analysis computer system the detected display screen computer code to detect context and activity of the intercepted specified digital interactions;
automatically identifying a potential purchase transaction based on an analysis of the context and activity of the specified digital interactions on display screen;
automatically determining at the financial analysis computer system whether the potential purchase transaction relates to one or more defined financial goals of the specified person;
storing in the financial analysis computer system a plurality of transaction analysis applications, each of the transaction analysis applications being used to analyze an associated type of transaction;
automatically invoking at the financial analysis computer system one or more of the plurality of transaction analysis applications to process said intercepted specified digital interactions determined to be related to the one or more defined financial goals of the specified person to determine a potential impact of said potential transaction on the one or more defined financial goals of the specified person; and
automatically generating the financial analysis computer system computer code for execution of a client guidance signal based on the determined potential impact of the potential purchase transaction, before the specified person commits to said potential transaction, in real time, and sending via the network the computer code for execution of the client guidance signal to the client computing device to instruct the client computing device to convey specified guidance to the specified person about the potential transaction.

15. The article of manufacture according to claim 14, wherein the specified guidance includes a representation on the client computing device of how the potential transaction impacts the one or more defined goals of the specified person.

16. The article of manufacture according to claim 14, wherein the specified guidance includes recommendations for specified services or products based on a determined impact of the potential transaction on said one or more goals of the specified person.

17. The article of manufacture according to claim 14, wherein:
the one or more defined goals of the specified person are stored in a repository;
the financial analysis computer system uses the specified interactions for comparing the potential transaction to the one or more defined goals stored in the repository for the specified person; and on the basis of said comparing, for determining defined guidance for the specified person about the potential transaction; and
the financial analysis computer system generates the client guidance signal based on said defined guidance.

18. The method according to claim 1, wherein the specified guidance includes deactivating submit buttons on the client computer device.

\* \* \* \* \*